US007278066B2

(12) United States Patent
Hodson

(10) Patent No.: US 7,278,066 B2
(45) Date of Patent: Oct. 2, 2007

(54) AUTOMATIC FIELDBUS DEVICE LOAD-MODE IDENTIFICATION

(75) Inventor: William R. Hodson, Telford, PA (US)

(73) Assignee: Honeywell International Inc, Morristown, NJ (US)

( * ) Notice: Subject to any disclaimer, the term of this patent is extended or adjusted under 35 U.S.C. 154(b) by 582 days.

(21) Appl. No.: 10/692,043

(22) Filed: Oct. 22, 2003

(65) Prior Publication Data

US 2005/0102585 A1    May 12, 2005

(51) Int. Cl.
G06F 11/00    (2006.01)
(52) U.S. Cl. .............................. 714/49; 714/4; 709/224
(58) Field of Classification Search .................... 714/4, 714/49, 57, 224
See application file for complete search history.

(56) References Cited

U.S. PATENT DOCUMENTS

| 4,908,746 | A |   | 3/1990  | Vaughn .................... 700/18 |
| 5,043,862 | A |   | 8/1991  | Takahashi et al. ........... 700/42 |
| 5,161,051 | A |   | 11/1992 | Whitney et al. ............ 350/351 |
| 5,768,119 | A | * | 6/1998  | Havekost et al. .............. 700/4 |
| 5,850,523 | A | * | 12/1998 | Gretta, Jr. .................. 709/224 |
| 5,877,957 | A |   | 3/1999  | Bennett ...................... 700/86 |
| 5,889,669 | A |   | 3/1999  | Kagami et al. .............. 700/17 |
| 6,112,127 | A |   | 8/2000  | Bennett ...................... 700/86 |
| 6,157,864 | A |   | 12/2000 | Schwenke et al. ........... 700/79 |
| 6,385,494 | B1 |  | 5/2002  | Blahnik et al. .............. 700/86 |
| 6,411,987 | B1 | *| 6/2002  | Steger et al. ............... 709/203 |
| 6,915,444 | B2 | *| 7/2005  | Vasko et al. .................. 714/4 |
| 2003/0023723 | A1 | * | 1/2003 | Griech ...................... 709/224 |
| 2003/0040812 | A1 |   | 2/2003 | Gonzales et al. ............ 700/19 |
| 2006/0053218 | A1 | * | 3/2006 | Thoren ...................... 709/224 |

\* cited by examiner

Primary Examiner—Gabriel Chu
Assistant Examiner—Tim Bonura
(74) Attorney, Agent, or Firm—Ohlandt, Greeley, Ruggiero & Perle, LLP

(57) ABSTRACT

A Fieldbus device and method for handling errors arising from parameter write messages. A load mode identifier detects if the parameter write messages are operator initiated or program initiated. If program initiated, communication of errors resulting from execution of the parameter writes is suppressed. Also, a rejection of a parameter write operation arising from the errors is suppressed for program initiated program write messages.

6 Claims, 4 Drawing Sheets

AUTOMATIC FIELDBUS DEVICE LOAD-MODE IDENTIFICATION

FIELD OF THE INVENTION

This invention relates to a method and Fieldbus device and, in particular, to the handling of errors that result from loading parameters into the Fieldbus device.

BACKGROUND OF THE INVENTION

The FOUNDATION Fieldbus Specifications are an open set of specifications that define a communications and process control standard for process control system networking which includes field devices. Those specifications (FF-103, FF-131, FF-581, FF-801, FF-816, FF-821, FF-822, FF-870, FF-875, FF-880, FF-890, FF-891, FF-892, FF-893, FF-894, FF-900, FF-940) include protocols for communicating between elements (hosts, field devices, monitors, bridges, etc.) on that industrial network. The configuration parameters for field devices are often prepared prior to the availability of the field device by storing them in a database related to a configuration tool.

At some later time, after the field device is installed, the set of parameters may be written to the field device as part of a "load" operation. Subsequently, an individual device parameter may be changed individually by a user, or the field device may be entirely re-loaded from the configuration database or from a saved image of the device database. However, when writing a new value of a parameter to a field device, the protocol does not include an indication of who or what is writing, or why that value is being written. It could be that a host or supervising element is writing a parameter to the field device as an agent for a human user (such as, an operator, technician, or control engineer). Alternatively, a parameter could be written as part of a series of parameter write messages used to load the field device as part of a larger field device "load" operation performed by a computer-based supervising element, the operation usually being initiated by a user.

Since there is no such indication, current field devices do not distinguish between an operator write and a programmatic loading of the field device, so error checks are the same for each operation. As a result, the load operation often results in a list of meaningless nuisance error indications that are intended to be advisory for a user making one entry at a time. A typical error indication results from writing a first parameter that is not actually being used because a second parameter has selected a configuration option that does not need it. The load of the parameter is harmless, but a warning response and possibly a rejection error response by the field device is unwanted and a nuisance in the case of the "load" operation. In fact, the second parameter may be changed to a configuration value that will utilize the first parameter a few messages later, so the error response would be meaningless and confusing, because the problem would be one of inappropriate order, not of incorrect value.

Another example would be checks that insure that parameter values are properly ordered. A low-low alarm limit must be less than a low alarm limit which, in turn, must be less than a high alarm limit which, in turn, must be less than a high-high alarm limit. While an interactive user must be aware of the ordering restrictions, the provider of the "load" operation generally is not aware of values and their relationship, so any rejections or warning errors from a field device being "loaded" is unwanted and a nuisance.

In general, when in a "load" operation, order and interaction of changing parameter values are usually unimportant rules to enforce. Lengthy lists of insignificant warnings or errors arising from these rules are unwanted and tend to render more significant warnings or errors harder to notice.

There is a need to eliminate or reduce the possibility of generating unwanted or meaningless notifications during an automatic or programmatic "load" operation.

SUMMARY OF THE INVENTION

The method of the present invention detects a group of parameter write messages that occur closer together than operator initiated parameter write messages and suppresses a communication of errors arising from the group of parameter write messages or a rejection of a parameter write message that results from any of the errors arising from the group of parameter write messages.

According to one aspect of the method of the present invention, a load-mode indicator is set ON for the group of parameter write messages. The communication of errors or rejection of a parameter write message is suppressed in response to the load-mode indicator being ON. The load mode indicator is set ON and OFF based on a comparison of the times of occurrence of a current parameter write message and a previous parameter write message with a time interval. The time interval is less than a time period between the operator initiated parameter write messages.

According to another aspect of the method of the present invention, consistency checks are performed oN a database of the parameters for errors after the group of parameter write messages has ended and notification of the consistency check errors is requested. For example, at least one of the consistency check errors is a configuration error.

A Fieldbus device of the present invention includes a processor, a memory and a load mode identifier that handles errors resulting from parameter write messages. The load identifier performs the operations of detecting a group of the parameter write messages that occur closer together than operator initiated parameter write messages and suppresses a communication of errors arising from the group of parameter write messages or a rejection of a parameter write message that results from any of the errors arising from the group of parameter write messages.

According to one aspect of the Fieldbus device of the present invention, the load identifier sets a load-mode indicator ON for the group of parameter write messages. The communication of errors or rejection of a parameter write message is suppressed in response to the load-mode indicator being ON. The load-mode indicator is set ON and OFF based on a comparison of the times of occurrence of a current parameter write message and a previous parameter write message with a time interval. The time interval is less than a time period between the operator initiated parameter write messages.

According to another aspect of the Fieldbus device of the present invention, the load identifier performs consistency checks of a database of the parameters for errors after the group of parameter write messages has ended and requests notification of the consistency check errors. For example, at least one of the consistency check errors is a configuration error.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
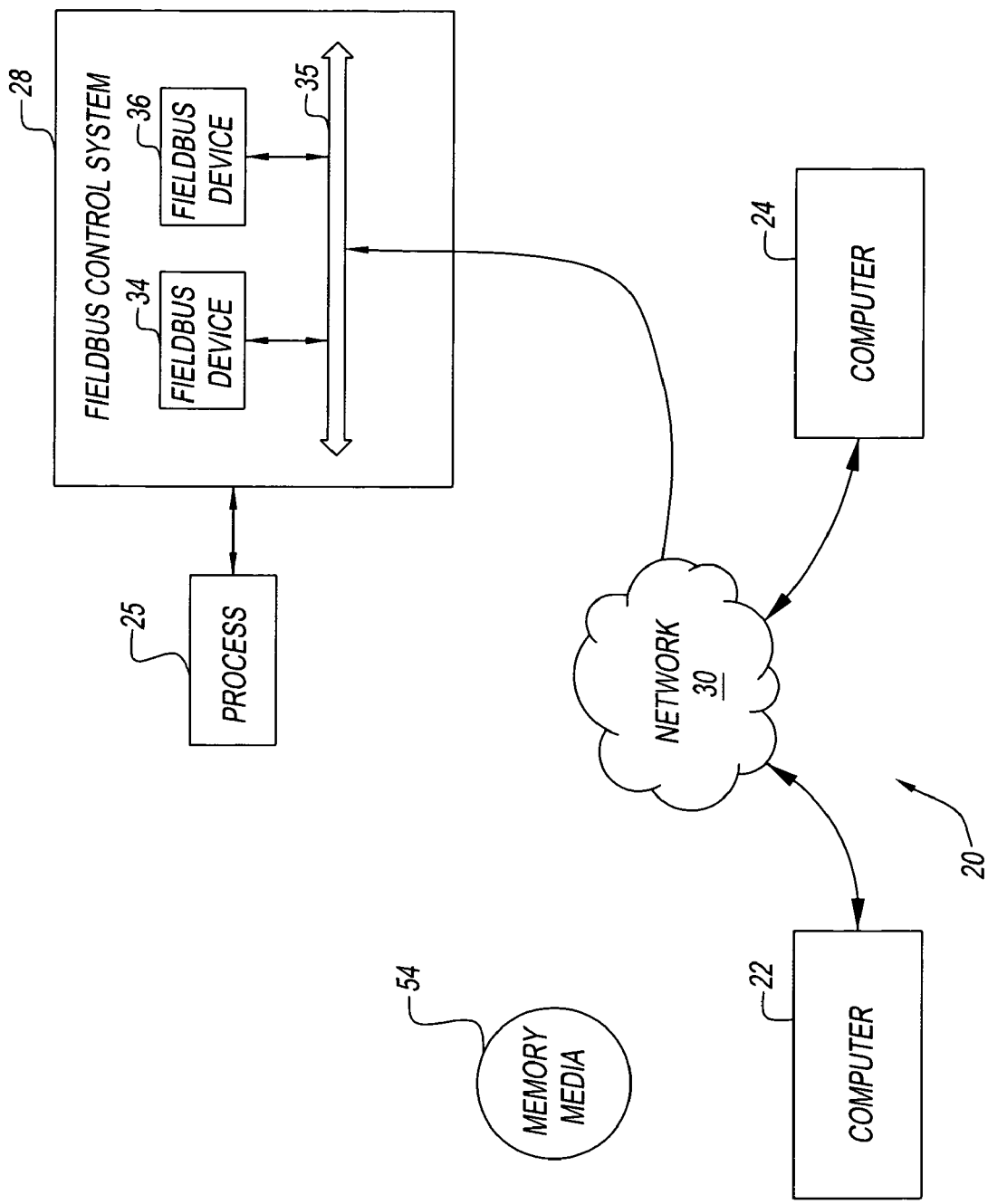
FIG. 1 is a block diagram of a control system in which the Fieldbus device and method of the present invention can be used.

Referring to FIG. 1, a control system 20 includes a computer 22, a computer 24, a Fieldbus control system 28 and a network 30. Computers 22 and 24 are interconnected with Fieldbus control system 28 via network 30. Although two computers are shown by way of example, it will be apparent to those skilled in the art that control system 20 may include more or less computers.

Fieldbus control system 28 includes one or more Fieldbus devices 34 and 36 (shown as two, by way of example) that monitor and/or control a process 25. Fieldbus devices 34 and 36 may include resident control software and are interconnected via a Fieldbus bus 35.

Computers 22 and 24 may each be a single computer or a plurality of computers interconnected via network 30. Network 30 may be any suitable wired or wireless communication network and may include process control networks, factory automation networks, the Internet, an Intranet, the public telephone system and the like, and combinations thereof.

Fieldbus devices 34 and 36 may be any suitable devices that monitor or control process 25, such as sensors of temperature, pressure, flow, level, vibration, sound, current, voltage, valves, pumps, electrical switches, and the like. Fieldbus devices 34 and 36 are substantially identical. Accordingly, only Fieldbus device 34 will be described in detail.

Figure 2:
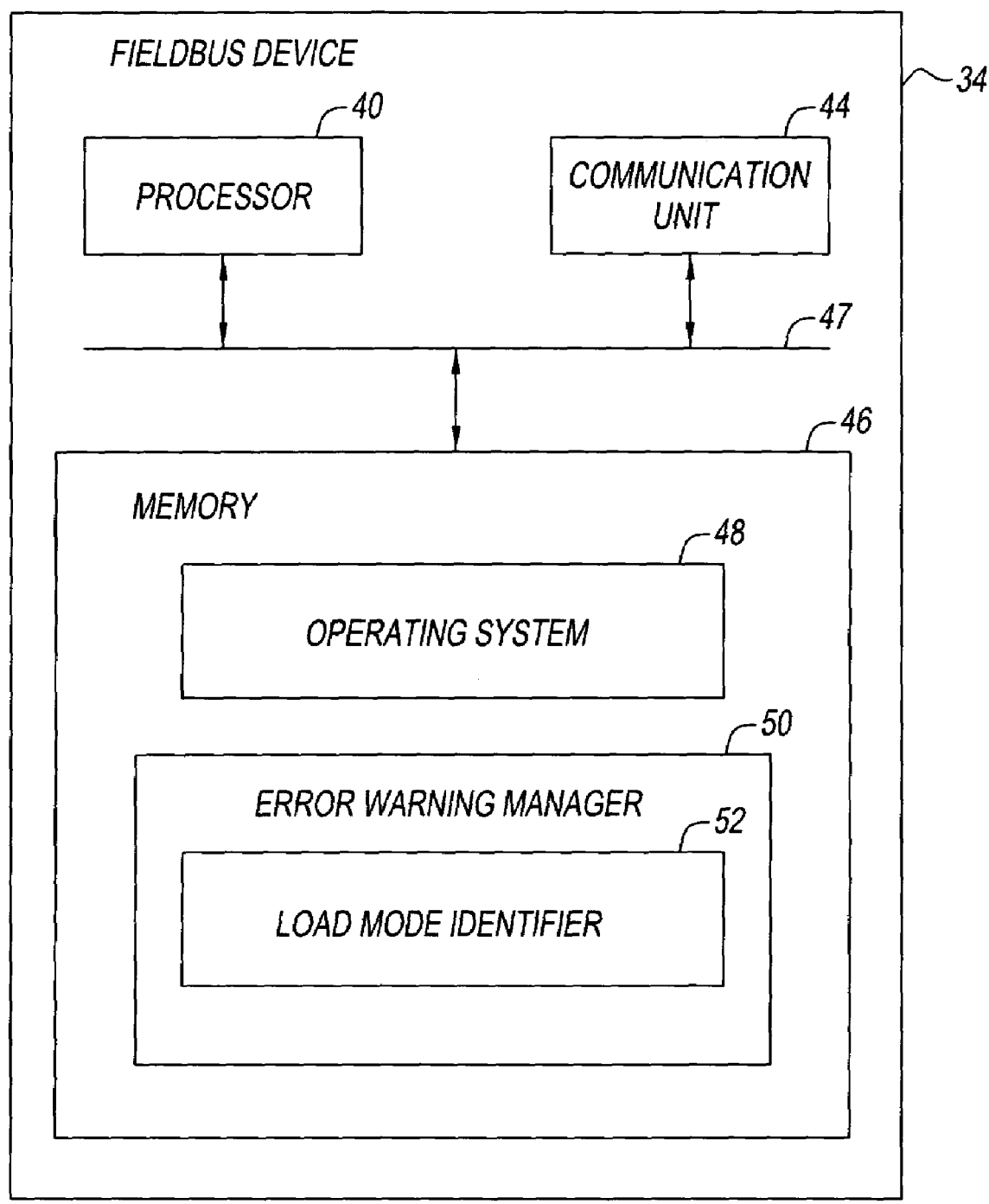
FIG. 2 is a block diagram of the Fieldbus device of the present invention.

Referring to FIG. 2, Fieldbus device 34 includes a processor 40, a communications unit 44, a memory 46 and a bus 47. Bus 47 interconnects processor 40, communications unit 44 and memory 46. Communications unit 44 includes the capability to communicate with other devices in control system 20 via network 30. Memory 46 includes an operating system 48 and an error warning manager program 50. Error warning manager program 50 includes a load-mode identifier program 52. Referring to FIGS. 1 and 2, a memory media 54 (e.g., a disk) contains a copy of load-mode identifier program 52 and may also include a copy of operating system 48, error warning manager program 50, or other software, which can be loaded into memory 46 directly or into computer 22 or 24 and then downloaded to Fieldbus devices 34 and 36.

Operating system 48 controls processor 40 to execute error warning manager program 50 and load-mode identifier program 52 for communicating errors that result from parameter write operations. Load-mode identifier program 52 recognizes an automatic loading operation and causes a suppression of the communication of any errors that result from the automatic loading and possible write rejection. Error messages are communicated via communications unit 44 and network 30 to a supervisory computer, e.g., computer 22. Computer 22 processes the error messages and issues notifications thereof, as needed to other Fieldbus devices in control system 20 as well as to other computers in control system 20, such as computer 24.

Load-mode identifier program 52 identifies that parameter write messages are part of a sequence of write messages that are indeed "loading" field device parameters automatically or programmatically. That is, the Fieldbus device (34 or 36) is a target of a "load" operation. Load-mode identifier program 52 responds to this identification to cause a suppression of the communication of error warning messages by error warning manager program 50 during the load operation and also may prevent rejection of the write. That is, communication of error and warning messages that are otherwise intended in response to parameter write operations by an interactive operator are suppressed. In response to completion of the load operation, warnings or errors found by consistency checks of the configuration of the Fieldbus device (34 or 36) can be reported by standard error notification mechanisms to desired destinations in control system 20.

Load-mode identifier program 52 provides the benefit that limit values and scaling values that must be properly ordered at the end of the "load" operation, need not be in order after each individual parameter write during the "load" operation. For example, a previous high limit of 10 and high-high limit of 12 can be replaced by a new high limit of 16 and high-high limit of 18. But if the high limit of 16 is written first, that limit would exceed the previous high-high limit of 12 until the new high-high limit of 18 was written. A field device that is aware that it is being "loaded" can suppress the meaningless and nuisance warning or write message rejection. Note that this problem cannot simply be resolved by always writing the high-high limit value before the high limit value, since if the new limit values were both lower in value than the current values (e.g., high limit of 6 and high-high limit of 8), an intermediate order violation could exist.

Another benefit of load-mode identifier program 52 is the suppression of the communication of errors arising from the writing of parameters that are used only if a certain option is selected, where those particular parameters happen to be written to the field device before the actual operational option is changed to the final value. At intermediate times during the "load", the set of parameter values in the field device may be inconsistent.

The current time is available to Fieldbus devices 34 and 36 via a time distribution system (not shown). For example, the time distribution system periodically distributes the current time to Fieldbus devices 34 and 36, as well as to any other Fieldbus devices connected in Fieldbus control system 28. The time distribution system may be resident in any computer (e.g., computer 22 or computer 24) or Fieldbus device (e.g., Fieldbus device 32 or Fieldbus device 34) that resides on network 30. Each Fieldbus device, in turn, adjusts its clocks to synchronize to a common time. Whenever a parameter write message is received, the field device will note the time.

If the time since the last parameter write message is less than or equal to a small timeout value that will be referred to as the "load-detection-interval" (for example, 1 second), the field device will determine that the write messages occurred at too close an interval for an interactive operator to have initiated them, and will set the load-mode indicator ON.

Figure 3:
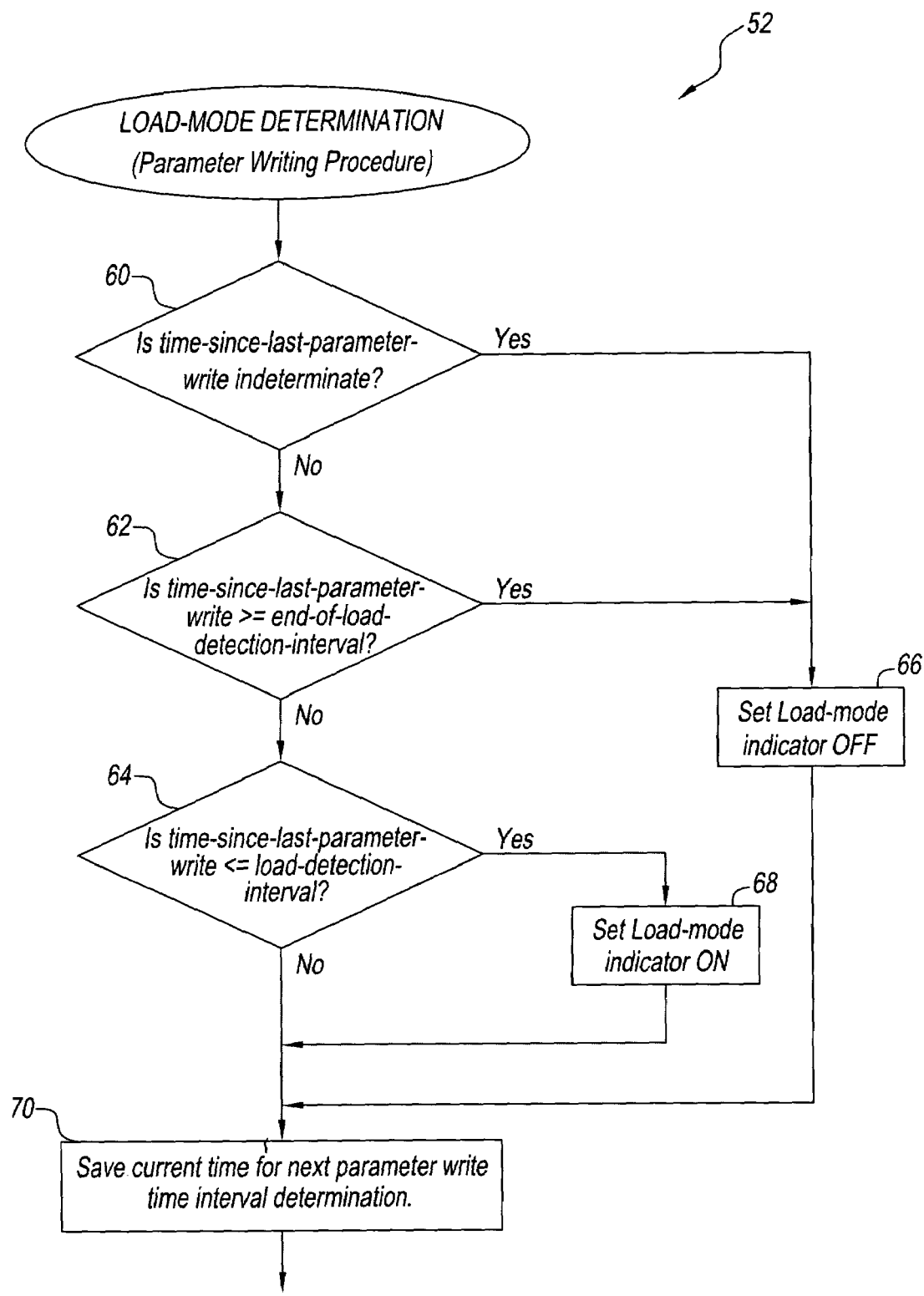
FIGS. 3 and 4 are flow diagrams of the load-mode identifier of the Fieldbus device of FIG. 2.

Referring to FIG. 3, load-mode identification program 52 at step 60 determines for a current parameter write message if the elapsed time since the last parameter write message is indeterminate. For example, the elapsed time may be indeterminate due to the absence of a last time to which to compare, which would be the case for the first occurrence of a parameter write message. If the finding is an indeterminate time, step 66 sets a load-mode indicator OFF. That is, the Fieldbus device assumes that the current parameter write message occurred at too great an interval for a program loader to have initiated it.

If step 60 finds that the elapsed time can be determined, step 62 determines if the elapsed time is equal to or greater than an end-of-load-detection-interval. The end-of-load-detection-interval is a larger timeout value (e.g., on the order of about 10 seconds) that implies that a load has completed due to its lengthy inactivity since the previous parameter write messages.

Periodic writing of a certain parameter may occur, by application. (An example may be adjustable tuning constants or alarm limits.) Such changes are usually made at a slow rate (say 30 seconds or less frequent). A preliminary step (not shown) can detect these periodic parameter write messages and cause them to be omitted from the parameter write messages provided to step 60.

If step 62 finds that the elapsed time is equal to or greater than the end-of-load-detection-interval, step 66 sets the load-mode indicator OFF. That is, the current parameter write message is assumed to be operator initiated.

If step 62 finds that the elapsed time is not equal to or greater than the end-of-load-detection-interval, step 64 determines if the elapsed time is equal to or less than the end-of-load-detection-interval.

If step 64 finds that the elapsed time is equal to or less than the end-of load-detection interval (i.e., the current parameter write message occurred at too close an interval for an interactive operator to have initiated it), step 68 sets the load-mode indicator ON. While the load mode indicator is ON, step 68 suppresses a communication any errors resulting from execution of the write messages and/or a rejection of any parameter write message that is caused by any of the errors. If step 64 finds that the elapsed time is not equal to or less than the load-detection-interval, the load mode is unaltered and step 70 saves the time of the current parameter write message for use when the next parameter write message occurs. Step 70 is also performed in response to steps 66 and 68 setting the load-mode indicator to OFF and ON, respectively.

If the time since the last parameter write message is greater than the smaller "load-detection-interval" timeout value but less than the larger "end-of-load-detection-interval", the field device will allow the load-mode indicator to remain in its current state.

Optionally, a timer is reset to time-out at the end-of-load-detection-interval each time a qualifying parameter write occurs. (If reset prior to time-out, the previous initiation of the timer is effectively canceled.) If the timer is triggered due to that end-of-load-detection-interval expiring, the load-mode indicator is set OFF and device database consistency checks are made by the target Fieldbus device, for example, Fieldbus device 34. Then a Configuration Error indication is set within Fieldbus device 34, detailed indicators may be set within Fieldbus device 34, and an error notification is requested by Fieldbus device 34.

Figure 4:
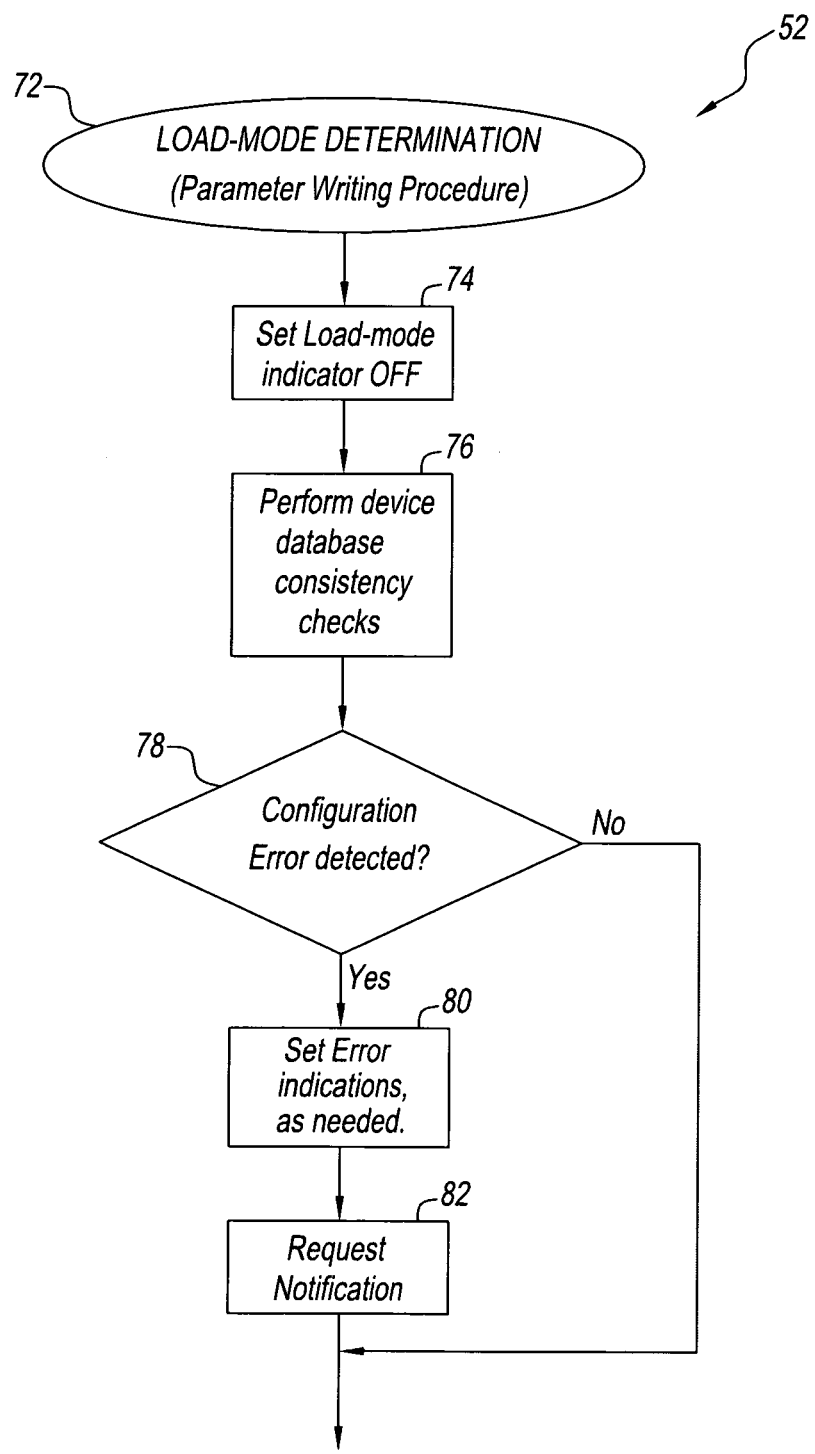

Referring to FIG. 4, load-mode identifier program at step 72 determines that the last non-periodic parameter write message exceeds the load-detection-interval. Step 74 responds by setting the load-mode indicator OFF. Step 76 performs database consistency checks. Step 78 determines if any configuration errors are detected. If so, step 80 sets error indications as needed and step 82 requests notification thereof. Computer 22 responds with its standard error message processing and notification procedure. The sequence of steps shown in FIG. 4 ends with the completion of step 82 or in the event that step 78 finds that there are no configuration errors.

The present invention having been thus described with particular reference to the preferred forms thereof, it will be obvious that various changes and modifications may be made therein without departing from the spirit and scope of the present invention as defined in the appended claims.

What is claimed is:

1. A method of handling errors arising from parameter write messages for a Fieldbus device, said method comprising:
   detecting a group of said parameter write messages that occur closer together than operator initiated parameter write messages;
   suppressing a communication of errors arising from said group of parameter write messages or a rejection of a parameter write operation, wherein said rejection results from any of said errors arising from said group of parameter write messages;
   setting a load-mode indicator ON for said group of parameter write messages, wherein said communication of errors or said rejection of a parameter write operation is suppressed in response to said load-mode indicator being ON, wherein said load-mode indicator is set ON and OFF based on a comparison of the times of occurrence of a current parameter write message and a previous parameter write message with a time interval, and wherein said time interval is less than a time period between said operator initiated parameter write messages.

2. The method of claim 1, further comprising the steps of performing consistency checks of a database of said parameters for errors after said group of parameter write messages has ended; and requesting notification of said consistency check errors.

3. The method of claim 2, wherein at least one of said consistency check errors is a configuration error.

4. A Fieldbus device comprising:
   a processor, a memory and a load mode identifier that handles errors resulting from parameter write messages, said load identifier performing the operations of:
      detecting a group of said parameter write messages that occur closer together than operator initiated parameter write messages;
      suppressing a communication of errors arising from said group of parameter write messages or a rejection of a parameter write message, wherein said rejection results from any of said errors arising from said group of parameter write messages;
      performing the operation of setting a load-mode indicator ON for said group of parameter write messages, wherein said communication of errors or said rejection of a parameter write message is suppressed in response to said load-mode indicator being ON, wherein said load-mode indicator is set ON and OFF based on a comparison of the times of occurrence of a current parameter write message and a previous parameter write message with a time interval, and wherein said time interval is less than a time period between said operator initiated parameter write messages.

5. The Fieldbus device of claim 4, wherein the load identifier further performs consistency checks of a database of said parameters for errors after said group of parameter write messages has ended; and requests notification of said consistency check errors.

6. The Fieldbus device of claim 5, wherein at least one of said consistency check errors is a configuration error.

* * * * *